March 10, 1964

C. H. ANDERSON 3,124,039

FILM GATE AND ADVANCING APPARATUS

Filed July 23, 1959

*INVENTOR.*
CHARLES H. ANDERSON
BY *Barnes & Seed*
ATTORNEYS

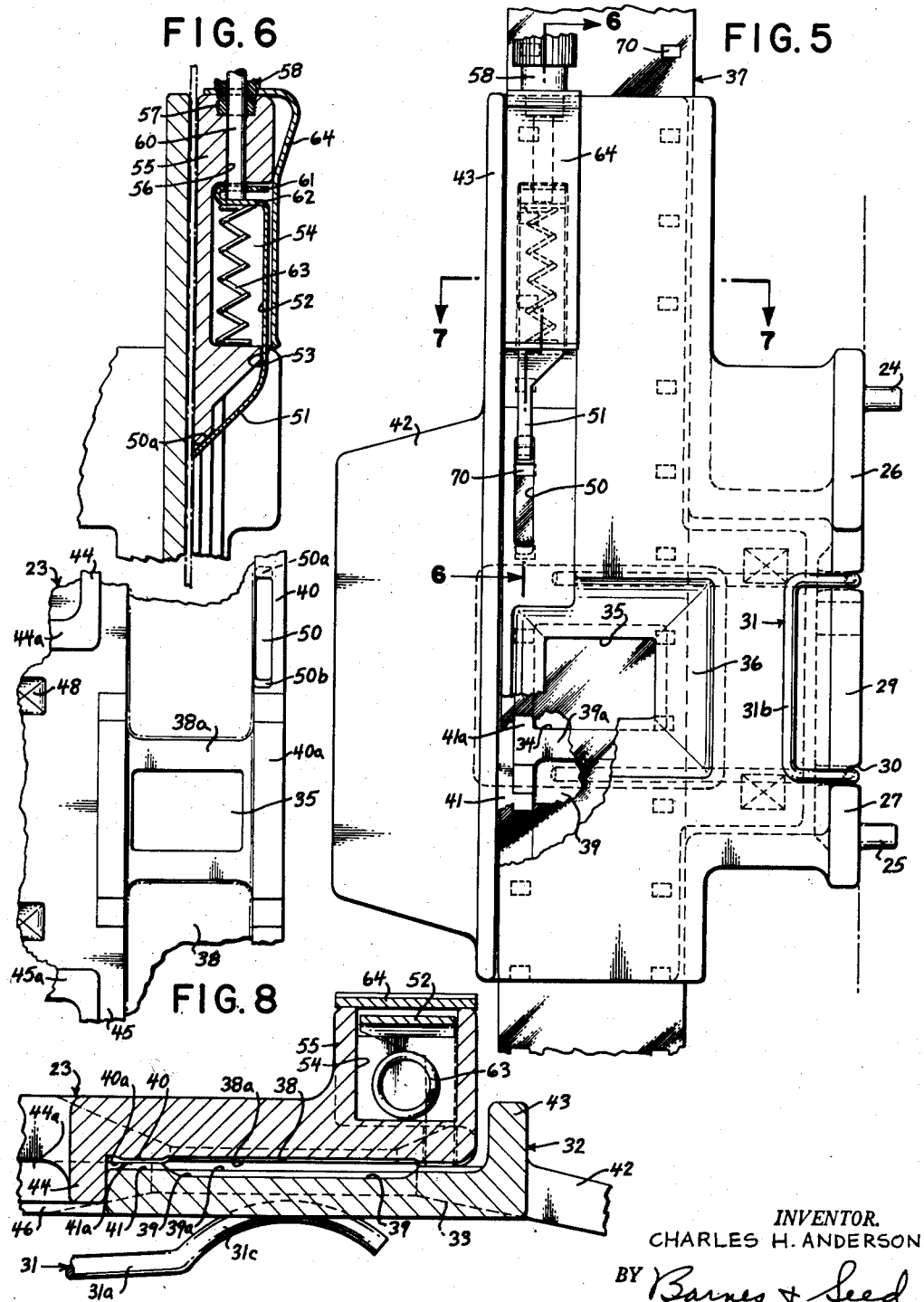

United States Patent Office 3,124,039
Patented Mar. 10, 1964

3,124,039
FILM GATE AND ADVANCING APPARATUS
Charles H. Anderson, Auburn, Wash., assignor to United States Projector & Electronics Corporation, Federal Way, Wash., a corporation of Washington
Filed July 23, 1959, Ser. No. 829,129
3 Claims. (Cl. 88—28)

The present invention relates to film gate and advancing apparatus for use between the condensing lens and objective lens systems of still picture projecting machines of the type using film strips.

As an important object, the invention aims to provide improved apparatus of simple and economical construction which will permit the projector operator to readily manually advance the film strip at will and from a position remote to the projector.

The invention also aims to provide improved apparatus which can be easily loaded and which will not damage the film during operation.

Other more particular objects and advantages will, together with these general objects, appear and be understood in the course of the following description and claims, the invention consisting in the novel construction and in the adaptation and combination of parts hereinafter described and claimed.

In the accompanying drawings:

FIG. 5 is a front elevational view of the invention with a film in operative position therein and with part of the fixed aperture plate and film broken away.

FIG. 6 is a fragmentary longitudinal vertical sectional view taken as indicated by line 6—6 of FIG. 5.

FIG. 7 is a horizontal sectional view to an enlarged scale taken along the line 7—7 of FIG. 5; and FIG. 8 is a back elevational view of a portion of the fixed aperture plate adjoining the aperture.

Figure 2:
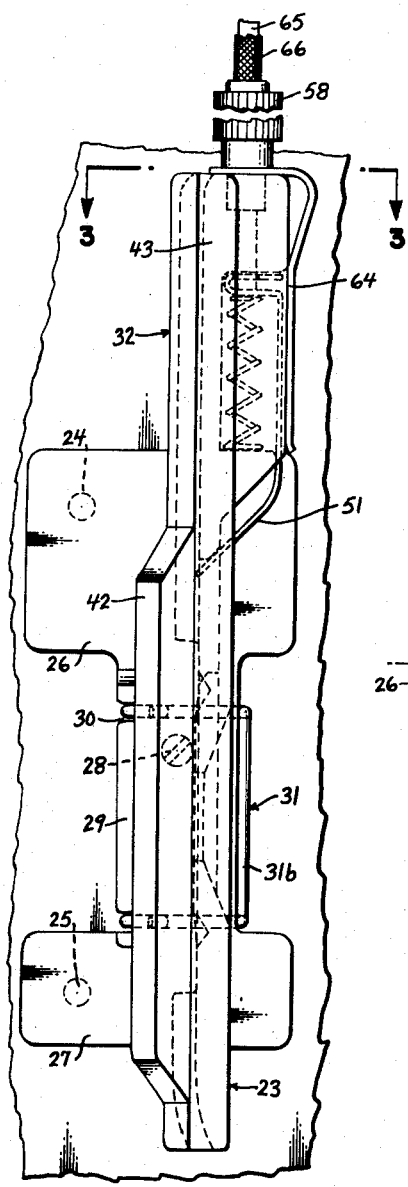
FIG. 2 is an enlarged elevational view.
Figure 1:
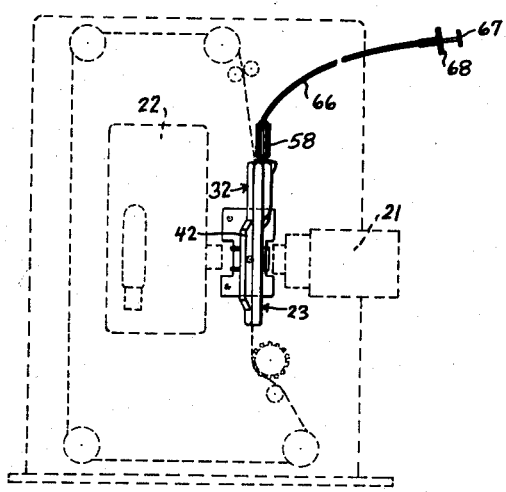
FIG. 1 is a side elevational view of my invention mounted on a projecting machine shown in phantom.
Figure 3:
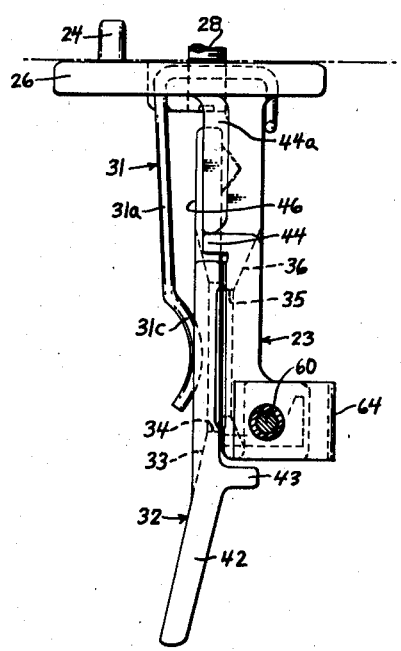
FIG. 3 is a transverse horizontal sectional view taken along the line 3—3 of FIG. 2.
Figure 4:
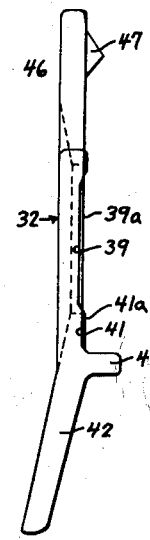
FIG. 4 is a top plan view of the movable aperture plate when completely detached.

Referring to the drawings it is seen that I provide a film gate for mounting between the objective lens unit 21 and the projection lamp and condensing lens assembly 22 of a still picture projecting machine. This film gate has a fixed aperture plate 23 positioned and secured to the machine by a pair of dowels 24—25 which project from top and bottom base feet 26—27 and by a thumb screw 28 which threads through a base flange 29 located between such feet. It will be noted that this base flange and the adjoining base portion of the plate 23 are formed with a pair of grooves 30. These receive the legs 31a of a wire spring clip 31 which functions to hold a movable aperture plate 32 in position against the back of the fixed aperture plate. In side elevation the legs of the clip 31 are hook shaped and have their bills connected by a center section 31b which bears against the front of the fixed plate 23. Near their free ends the shanks of the clip legs are arched forwardly at 31c and seat against opposite beveled faces 33 which recess into a rectangular film aperture 34 provided by the movable plate 32. Registering with the latter is a somewhat smaller aperture 35 formed in the fixed plate 23 and having its front surrounding portion flared outwardly at 36.

For providing a travel path therebetween for a film strip 37, the aperture plates 23, 32 are formed with shallow oppositely dished channels 38—39 defined by respective pairs of track portions 40—41 for receiving the side edge portion of the strip. These track portions are increased in height slightly at the sides of the related apertures as indicated at 40a—41a and the channels 38—39 are shallowed accordingly at 38a—39a, and namely at the top and bottom of the apertures. With this arrangement, pressure on the film strip is concentrated at the gate aperture.

In feeding or removing the film from between the plates it is necessary to separate them, and for this purpose the movable plate 32 is provided with a rearwardly sloped finger engaging extension 42. This extension projects out beyond a forwardly directed guide flange 43 which overlaps the outer edge of the fixed plate and is complemented by rearwardly projecting guide flanges 44—45 running along the center of the latter from top and bottom and then turning toward the base to merge by portions 44a—45a with the base feet 26—27. The extension 42 permits pressure to be readily manually applied to the movable plate against the action of the spring clip. In order that such pressure will result in a pivoting action, the movable plate has a positioning extension 46 located opposite the finger engaging extension 42 and formed with a pair of forward pivot prongs 47. This positioning extension nests between the guide flange portions 44a—45a of the fixed aperture plate and its prongs 47 fit part way into seats 48. With this arrangement the movable plate is always positively positioned with respect to the fixed plate while remaining free to be manually pivoted to a gate open position in opposition to the spring clip.

Continuing to the film advancing mechanism of the present invention, it will be noted that the fixed aperture plate has an elongated slot 50 therein directly adjoining the channel 38 slightly above the shallowing 38a thereof. The ends 50a—50b of this slot 50 are sloped downwardly from front to back at about a forty-five degree angle in accordance with the slope in a leaf-like advance finger 51 which necks and self-springs toward the movable aperture plate from a flat slide 52. The latter seats near its lower end on a countersunk ledge 53 located at the bottom of a forwardly exposed chamber 54 formed in an enlargement 55 of the fixed plate. At its upper end this enlargement has a bore 56 merging with its chamber 54 and provided with a tapped counter-bore 57 for threadably receiving a screw end of a flexible cable fitting 58 having a knurled finger gripping head. Projecting from this fitting through the bore 56 into the chamber 54 is a plunger 60. In the chamber the plunger passes through one leg 61 and bears against the other leg 62 of a U-shaped spring seat which elbows from the upper end of the slide 52. This spring seat together with the opposite end of the chamber 54 restrict a return spring 63. The slide 52 is kept in place by a generally L-shaped leaf-type retainer spring 64 which has its shorter leg anchored against the bored end of the enlargement 55 by the cable fitting 58. Operation of the plunger 60 is performed by a flexible cable 65 connected thereto in the fitting 58 and having a flexible sheath 66. At its other end the cable 61 is connected to a headed stem 67 which is slide mounted in a guide 68 clamped to the related end of the sheath. This flexible cable assembly can be identical to the shutter release cables used on most cameras.

My invention is designed to handle a conventional film strip; thus, the strip 37 has two rows of regularly spaced sprocket or advancing holes 70 along its side edges between which the picture frames are centered longitudinally of the strip. The slot 50 overlies the travel line of one of these rows, the other row having no part in the functioning of the present invention, and is slightly longer than the spacing of the advancing holes 70 so that when one of the latter is exposed at the advanced end of the slot the next trailing such hole is exposed at the other end of the slot. It is this trailing hole with which the advancing finger 51 interfits responsive to finger pressure applied to the head of the stem 67. This pressure acting through the flexible cable 65 and plunger 60 shifts the slide 52 toward the slot 50 in opposition to the return spring 63, and as a result the finger 51 due to its spring characteristic, rides down the related sloped end wall 50a of the slot into the trailing advancing hole and forwardly against the leading edge of the latter. Further pressure causes the finger to advance in the slot until it engages the lead end wall 50b thereof which thus acts as a stop. During this finger advance the film strip is pushed by the finger the exact distance to advance the next picture frame to be viewed into the gate aperture. For this result the slot 50 must of course be properly spaced from the gate aperture. When the stem 67 is released the spring 63, by acting against the slide leg 62, returns the slide 52 and advance finger 51 to their starting position. At the start of this return travel the finger 51 engages the trailing edge of the advancing hole in which it has just operated and springs outwardly slightly to ride during its return along the face of the film. In the illustrated embodiment the slot is spaced one frame from the gate aperture so that the advancing finger can operate on the film as close as possible to the portion of the film's travel path whereat the pressure exerted by the spring clip 31 is concentrated. This pressure is sufficient to resist any tendency of the advancing finger to drag the film strip during its return travel.

Thus, it is seen that the operator need only press the stem 67 each time he wishes to advance the film strip a picture frame. Furthermore, he can be located remote to the projector, the only limitation being the length of the flexible cable 65. To load another film, the operator presses the extension 42 to pivot the movable plate about the prongs 47 and thereby opens the gate in opposition to the spring clip 31 so that film can be readily removed and inserted sideways into the film channel. Hence an endless strip of film can be used. During this film loading operation the operator need not concern himself with longitudinally centering the film in the aperture since subsequent pressing of the stem 67 will always result in pickup of an advancing hole and movement thereof to the lead end of the slot 50.

If the film strip is endless, such as frequently used for sales and training presentations, it can be guided to and from the film gate by a set of rollers arranged, for example, as those shown for the film in United States Patent No. 2,303,633, issued December 1, 1942. In fact, the present invention can be conveniently used in place of the film gate and feeding sprocket shown in such patent.

The advantages of the invention, it is thought, will have been clearly understood from the foregoing detailed description of the illustrated preferred embodiment. Minor changes will suggest themselves and may be resorted to without departing from the spirit of the invention as defined in the claims.

What I claim is:

1. Combination film gate and advancing apparatus for use with a strip of film having multiple picture frames therealong and a row of advancing holes spaced apart in correspondence to the length of said frames, film gate means presenting a film path, a slot arranged to register with the travel line of said row of a film in said path, and an aperture intersecting said path for revealing one picture frame at a time, said slot having a film feed and discharge ends, a film advancing spring finger carried by said film gate means and self-urged into said slot to consecutively interfit by its tip with said advancing holes in the film, and finger advancing and retracting means mounted on said film gate means and operatively associated with said finger, said feed end of the slot being sloped toward its discharge end and said path, and said discharge end of the slot being undercut to generally parallel said slope of the feed end.

2. Combination film gate and advancing apparatus for use with a strip of film having multiple picture frames therealong and a row of advancing holes spaced apart in correspondence to the length of said frames, film gate means presenting a film passageway, said film gate means being formed with an aperture intersecting said passageway for revealing one picture frame at a time and a slot intersecting said passageway along the travel line of the advancing holes of a said film occupying said passageway, film interfitting means carried by said film gate means and spring-urged into said slot for consecutively interfitting with the advancing holes of such film, advancing means mounted on said film gate means and operatively connected to said film interfitting means for advancing it from one end of said slot to the other, and a return spring operatively associated with said advancing means for retracting said film interfitting means to said one end of the slot after each picture frame advancing movement thereof, said one end of the slot being sloped toward its said other end whereby said film interfitting means is lifted out of contact with said film strip when it is fully retracted, and said other end of the slot being so located that a picture frame is centered in said aperture each time such other end is engaged by said film interfitting.

3. Combination film gate and advancing apparatus for use with a strip of film having multiple picture frames therealong and a row of advancing holes spaced apart in correspondence to the length of said frames, film gate means presenting a film path, a slot arranged to register with the travel line of said row of a film in said path, and an aperture intersecting said path for revealing one picture frame at a time, said slot having a film feed and discharge ends, a film advancing spring finger carried by said film gate means and self-urged into said slot to consecutively interfit by its tip with said advancing holes in the film, and finger advancing and retracting means mounted on said film gate means and operatively associated with said finger, a flexible cable having a sheath anchored to said film gate means and having one of its ends bearing against said other end of said spring finger so as to advance said finger when the other end of said cable is manually pressed, and a return spring bearing against the other end of said spring finger in opposition to said cable for retracting the finger after each picture frame advancing movement thereof.

References Cited in the file of this patent

UNITED STATES PATENTS

| | | |
|---|---|---|
| 1,153,110 | Jenkins | Sept. 7, 1915 |
| 1,796,432 | Barlatier | Mar. 17, 1931 |
| 1,923,855 | Victor | Aug. 22, 1933 |
| 1,933,066 | Merle | Oct. 31, 1933 |
| 2,104,698 | Kohnle | Jan. 4, 1938 |
| 2,146,237 | Stephens | Feb. 7, 1939 |
| 2,228,880 | Landrock | Jan. 14, 1941 |
| 2,280,737 | Alburger | Apr. 21, 1942 |
| 2,427,294 | McNabb | Sept. 9, 1947 |
| 2,457,915 | Nemeth | Jan. 4, 1949 |
| 2,696,140 | Larson | Dec. 7, 1954 |
| 2,718,628 | Bartlett et al. | Sept. 20, 1955 |
| 2,734,421 | Critoph et al. | Feb. 14, 1956 |
| 2,803,993 | Herrmann et al. | Aug. 27, 1957 |

FOREIGN PATENTS

| | | |
|---|---|---|
| 5,502 | Great Britain | Mar. 4, 1914 |
| 229,243 | Great Britain | Printed in 1926 |
| 479,749 | Germany | July 24, 1929 |
| 741,281 | France | Dec. 3, 1932 |
| 131,708 | Austria | Feb. 10, 1933 |